United States Patent
Pau et al.

(10) Patent No.: US 6,542,643 B1
(45) Date of Patent: Apr. 1, 2003

(54) MEASUREMENT OF ACTIVITY OF VIDEO IMAGE BY DCT AND FILTERING OF THE PREDICTION ERROR COEFFICIENTS

(75) Inventors: Danilo Pau, Sesto San Giovanni (IT); Luca Bortot, Milan (IT); Maria Luisa Sacchi, Milan (IT)

(73) Assignee: Microelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/657,433

(22) Filed: Sep. 7, 2000

(30) Foreign Application Priority Data

Sep. 8, 1999 (EP) .............................. 99830560

(51) Int. Cl.$^7$ ................................................ G06K 9/36
(52) U.S. Cl. ..................................................... 382/236
(58) Field of Search .............................. 382/232, 236, 382/238, 240, 242, 248, 250; 358/432, 433; 348/384.1, 394.1, 395.1, 400.1, 401.1–404.1, 407.1–416.1, 420.1, 421.1, 425.2, 430.1, 431.1; 375/240.23, 240.24

(56) References Cited

U.S. PATENT DOCUMENTS

| 5,699,457 A | 12/1997 | Adar et al. ................. 382/239 |
| 5,742,344 A | 4/1998 | Odaka et al. ............... 348/416 |
| 6,026,217 A | * 2/2000 | Adiletta ................. 395/200.77 |
| 6,101,276 A | * 8/2000 | Adiletta et al. ............. 382/236 |

FOREIGN PATENT DOCUMENTS

| EP | 492528 | 7/1992 | .......... G11B/20/10 |
| EP | 586225 | 3/1994 | .......... H04N/7/133 |
| EP | 743793 | 11/1996 | ............ H04N/7/30 |
| EP | 905981 | 3/1999 | ............ H04N/7/32 |
| WO | 96/36182 | 11/1996 | ............ H04N/7/32 |

OTHER PUBLICATIONS

Tae–Yun Chung et al. "Quantization Control for Improvement of Image Quality Compatible With MPEG2" IEEE Transactions on Consumer Electronics, Nov. 1994, pp. 821–825.

* cited by examiner

*Primary Examiner*—Jose L. Couso
(74) *Attorney, Agent, or Firm*—Allen, Dyer, Doppelt, Milbrath & Gilchrist, P.A.; Lisa K. Jorgenson

(57) ABSTRACT

A method for measuring the activity of a macroblock of a video picture in the direct cosine transform domain of values assumed by a selected component of the video signal includes dividing the macroblock into blocks of data in the discrete cosine transform domain before quantization, and separately storing each block of data in a memory. The method further includes reading each block of data stored in the memory for obtaining respective coefficients, and multiplying an absolute value of each coefficient by a selected mask of words comprising a number of words not exceeding a number of words forming each block. The results of the multiplications are summed for producing an activity coefficient for each block. A first activity coefficient of the macroblock is calculated corresponding to a sum of the activity coefficients produced for each block. A normalized activity value of the macroblock is calculated as the ratio between a sum of double the first activity coefficient with a mean activity coefficient relative to a preceding coded frame, and a sum of double the mean activity coefficient with the first activity coefficient.

28 Claims, 5 Drawing Sheets

MEASUREMENT OF ACTIVITY OF VIDEO IMAGE BY DCT AND FILTERING OF THE PREDICTION ERROR COEFFICIENTS

FIELD OF THE INVENTION

The present invention relates to the coding of video sequences, and, more particularly, to a method for measuring the activity of a portion of a picture to improve the effectiveness of the buffering that is performed during the coding process, especially in low cost applications.

This is useful in digital video coders where it is necessary to evaluate the activity of a block of information in the frequency domain. Due to the importance of the MPEG standard in treating digitized video sequences, reference will be made to an MPEG2 system to illustrate the present invention.

BACKGROUND OF THE INVENTION

The MPEG (Moving Pictures Experts Group) standard defines a set of algorithms dedicated to the compression of sequences of digitized pictures. These techniques are based on the reduction of the spatial and temporal redundance of the sequence. Reduction of spatial redundance is achieved by compressing independently the single images via quantization, discrete cosine transform (DCT) and Huffman coding.

The reduction of temporal redundance is obtained using the correlation that exists between successive pictures of a sequence. Each image can be expressed locally as a translation of a preceding and/or successive image of the sequence. To this end, the MPEG standard uses three kinds of pictures; I (Intra Coded Frame), P (Predicted Frame) and B (Bidirectionally Predicted Frame). The I pictures are coded in a fully independent mode. The P pictures are coded with respect to a preceding I or P picture in the sequence. The B pictures are coded with respect to two pictures of the I or P kind, which are the preceding one and the following one in the video sequence (see FIG. 1).

A typical sequence of pictures can be I B B P B B P B B I B . . . , for example. This is the order in which they will be viewed. Given that any P is coded with respect to the preceding I or P, and any B is coded with respect to the preceding and following I or P, it is necessary that the decoder receive the P pictures before the B pictures, and the I pictures before the P pictures. Therefore, the order of transmission of the pictures will be I P B B P B B I B B . . . .

Pictures are processed by the coder sequentially, in the indicated order, and are successively sent to a decoder which decodes and reorders them, thus allowing their successive displaying. To code a B picture it is necessary for the coder to keep in a dedicated memory buffer, called frame memory, the I and P pictures, coded and thereafter decoded, to which current B picture refers, thus requiring an appropriate memory capacity.

One of the most important functions in coding is motion estimation. Motion estimation is based on the following consideration. A set of pixels of a frame of a picture may be placed in a position of the successive picture obtained by translating the preceding one. These transpositions of objects may expose parts that were not visible before as well as changes of their shape, such as during a zooming, for example.

The family of algorithms suitable to identify and associate these portions of pictures is generally referred to as motion estimation. Such an association of pixels is instrumental to calculate a different picture removing redundant temporal information, thus making more effective the successive processes of DCT compression, quantization and entropic coding.

A typical example of a system using this method may be illustrated based upon the MPEG2 standard. A typical block diagram of a video MPEG2 coder is depicted in FIG. 1. Such a system is made of the following functional blocks:

1) Chroma Filter Block From 4:2:2 to 4:2:0. In this block there is a low pass filter operating on the chrominance component, which allows the substitution of any pixel with the weighed sum of neighboring pixels placed on the same column and multiplied by appropriate coefficients. This allows a successive subsampling by two, thus obtaining a halved vertical definition of the chrominance.

2) Frame Ordering Block. This block is composed of one or several frame memories outputting the frames in the coding order required by the MPEG standard. For example, if the input sequence is I B B P B B P etc., the output order will be I P B B P B B . . . .

The Intra coded picture I is a frame or a semi-frame containing temporal redundance. The Predicted-picture P is a frame or semi-frame from which the temporal redundance with respect to the preceding I or P (precedingly co/decoded) has been removed. The Biredictionally predicted-picture B is a frame or a semi-frame whose temporal redundance with respect to the preceding I and successive P (or preceding P and successive P) has been removed. In both cases the I and P pictures must be considered as already coded/decoded.

Each frame buffer in the format 4:2:0 occupies the following memory space:

Standard PAL

| 720 × 576 × 8 for the luminance | (Y) = 3,317,760 bits |
| 360 × 288 × 8 for the chrominance | (U) = 829,440 bits |
| 360 × 288 × 8 for the chrominance | (V) = 829,440 bits | total Y + U + V = 4,976,640 bits

Standard NTSC

| 720 × 480 × 8 for the luminance | (Y) = 2,764,800 bits |
| 360 × 240 × 8 for the chrominance | (U) = 691,200 bits |
| 360 × 240 × 8 for the chrominance | (V) = 691,200 bits | total Y + U + V = 4,147,200 bits

3) Estimator. This is the block that removes the temporal redundance from the P and B pictures. This functional block operates only on the most energetic component, and, therefore, the richest of information of the pictures which compose the sequence to code, such as the luminance component.

4) DCT. This is the block that implements the discrete cosine transform according to the MPEG2 standard. The I picture and the error pictures P and B are divided in blocks of 8*8 pixels Y, U, and V on which the DCT transform is performed.

5) Quantizer Q. An 8*8 block resulting from the DCT transform is then divided by a quantizing matrix to reduce the magnitude of the DCT coefficients. In particular, the cosine transformed matrix of the macroblock is divided by the matrix mQuant*Quantizer_Matrix, where Quantizer_Matrix is a priori established and can vary from picture to picture. In such a case, the information associated to the highest frequencies, less visible to human sight, tends to be removed. The result is reordered and sent to the successive block.

6) Variable Length Coding (VLC). The codification words output from the quantizer tend to contain a large number of null coefficients followed by nonnull values. The null values preceding the first nonnull value are counted and the count figure forms the first portion of a codification word, the second portion of which represents the nonnull coefficient.

These pair tend to assume values more probable than others. The most probable ones are coded with relatively short words composed of 2, 3 or 4 bits while the least probable are coded with longer words. Statistically, the number of output bits is less than in the case such a criteria is not implemented.

7) Multiplexer and Buffer. Data generated by the variable length coder, the quantizing matrices, the motion vectors and other syntactic elements are assembled for constructing the final syntax contemplated by the MPEG2 standard. The resulting bitstream is stored in a memory buffer, the limit size of which is defined by the MPEG2 standard requirement that the buffer cannot be overfilled. The quantizer block Q attends to such a limit by making the division of the DCT 8*8 blocks dependent upon how far the system is from the filling limit of such a memory buffer and on the energy of the luminance component of the 16*16 source macroblock taken upstream of the motion estimation, of the prediction error generation, and the DCT transform.

8) Inverse Variable Length Coding (I-VLC). The variable length coding functions specified above are executed in an inverse order.

9) Inverse Quantization (IQ). The words output by the I-VLC block are reordered in the 8*8 block structure, which is multiplied by the same quantizing matrix that was used for its preceding quantization.

10) Inverse DCT (I-DCT). The DCT transform function is inverted and applied to the 8*8 block output by the inverse quantization process. This permits passing from the domain of spatial frequencies to the pixel domain.

11) Motion Compensation and Storage. At the output of the I-DCT, the following may be present. A decoded I frame (or semiframe) that must be stored in a respective memory buffer for removing the temporal redundancy with respect thereto from successive P and B pictures. A decoded prediction error frame (or semiframe) P or B must be summed to the information precedingly removed during the motion-estimation phase. In case of a P picture, such a resulting sum stored in a dedicated memory buffer is used during the motion estimation process for the successive P pictures and B pictures. These frame memories are distinct from the frame memories that are used for re-arranging the blocks.

12) Display Unit from 4:2:0 to 4:2:2. This unit converts the frames from the format 4:2:0 to the format 4:2:2 and generates the interlaced format for the successive displaying. The chrominance components eliminated by the chroma filter block are restored by interpolation of the neighboring pixels. The interpolation includes in a weighed sum the neighboring pixels for appropriate coefficients, and limits between 0 and 255 the value so obtained.

The compression rate control block will now be discussed. The rate control block of FIG. 1 is composed of five blocks as shown in FIG. 2. A first block is the Target Bit Allocation block, which establishes the number of bits usable for the current picture i (where i=I, P or B). The allocation is done at the beginning of the picture coding while considering the complexity measure derived by the past pictures of the same kind.

A second block is the Local Control block which furnishes the filling state of the buffer of FIG. 1 and allows calculation of the control parameter qj(n) for each macroblock before its quantization. A third block is the Adaptive Quantization block, which completes calculation of the mQuant by multiplying the qj(n) factor by the activity coefficient (N_actj) of a macroblock. More particularly, this third block calculates the quantization parameter mQuant= N_actj(n) *qj(n).

A fourth block is the Variance Calculator block, which calculates the activity beginning from a macroblock placed on the source picture and thus in the pixel domain by a method based on the variance of a pixel block belonging to the source picture. A fifth block is the Normalized Activity block which calculates the activity normalized with respect to the average activity calculated for the previously coded picture.

Examples of the first, second and third blocks are described in European Patent No. 98830599.1. An example of the fifth block is described in European Patent No. 97830591.0. Both of these patents are assigned to the current assignee of the present invention, and are incorporated herein by reference in their entirety. Implementation of the functioned fifth block was commonly known by one skilled in the art prior to the above referenced patent applications.

Assumptions about the picture format will now be discussed. A picture frame is formed by a pair of half-frames. The half-frames are formed by luminance and chrominance components. To apply the algorithm for measuring the macroblock activity only on the most energetic component, which is the richest of information, the luminance component is selected.

The luminance component is represented as a matrix having N rows and M columns. Each frame is divided into portions called macroblocks having R rows and S columns. The results of the division N/R and M/S must be two integers, but not necessarily equal to each other. The MPEG2 establishes the dimension R=16 and S=16, which are considered as an example for the method according to the patent application.

Let MBq(i,j) be a macroblock belonging to the current frame and subjected to the MPEG2 coding (motion estimation, prediction error calculation, DCT transform, quantization, etc.), and whose first pixel in the top left side is in the cross-position between the i-th row and j-th column. The pair (i,j) is characterized in that i and j are an integer multiple respectively of R and S.

Location of the macroblock on the picture is illustrated in FIG. 3. The dashed horizontal arrows indicate the scanning order used to locate the macroblocks. Let MBe(i,j) be the prediction error macroblock calculated as a difference between the corresponding pixels of two macroblocks. The first macroblock MBq(i,j) belongs to the current frame, and the second macroblock Mbp(k,h) belongs to a preceding and/or future frame or to an average of both of them. The second macroblock Mbp(k,h) results as the best predictor of MBq at the end of the process of motion estimation.

In particular, if the current picture is an I type, then MBe(i,j)=MBq(i,j), while if the picture is a P or B type, then Mbe(i,j)=MBq(i,j)−MBp(k,h). Referring again to FIG. 2 and to the Adaptive Quantization block, the Compute Normalized Activity block, and the Variance Calculator block, the calculation of the activity and thus of the parameter N_actj in the model aproposed by the above referenced patents is carried out by estimating the variance of the luminance component for each block. The activity of the macroblock is given by the smallest of the activities of eight luminance blocks in which a frame macroblock is divisible.

The method may be described as follows. A given macroblock MBq(i,j) is reorganized in 4 blocks containing frame information and in 4 blocks containing half-frame information. For each of the eight blocks, four of the blocks contain information belonging to both the joined half-frames, and the other four contain information belonging to the The following operations are performed. The luminance component (64 coefficients) is read, and the variance is calculated. The variance is calculated according to the method described in the above referenced European Patent No. 97830591.0 or by any other equivalent method. The activity actj= min(var1, var2, var3, var4, var5, var6, var7, var8) is calculated.

The following normalized activity is also calculated:

$$N\_actj = \frac{2*actj + \text{mean\_actj}}{actj + 2*\text{mean\_actj}}.$$

The variable mean_actj is the mean of the activity actj referred to in the preceding coded frame. The calculation of the activity on the source macroblock MBq(i,j) implies a significant computational complexity, and has non-negligible infuence on costs.

SUMMARY OF THE INVENTION

In view of the foregoing background, it is an object of the present invention to provide a method for calculating the activity of a macroblock of a video picture which operates entirely in the direct cosine transform domain on a component of the signal of the production error macroblock (MBe(i,j)), thus permitting a significant reduction in the computational complexity.

Moreover, the efficiency of quantization on the luminance and chrominance components that is carried out on each picture being fed to the coder is markedly increased. The temporal redundance of these pictures has been eventually removed and returned in the spatial frequency domain by the discrete cosine transform.

An algorithm according to the present invention provides an efficient alternative to the above-noted conventional method that has been used for calculating the activity. In particular, the algorithm carries out the calculation of the prediction error considered in the spatial frequency domain obtained by the discrete cosine transform, as shown in FIG. 3. This is done instead of carrying it out on the macroblocks placed on the source picture.

This and other objects, advantages and features are provided by a method that carries out a filtering of the DCT coefficients of each prediction error block by an appropriate frequency response mask. Afterwards, the value of such a response is averaged on the four blocks composing the luminance component of the DCT transformed macroblock to obtain the activity coefficient. It is not necessary to make any distinction on the frame or half-frame type of content because such a choice has been already done on the data before the DCT transform.

DETAILED DESCRIPTION OF THE PREFERRED EMBODIMENTS

Figure 1:
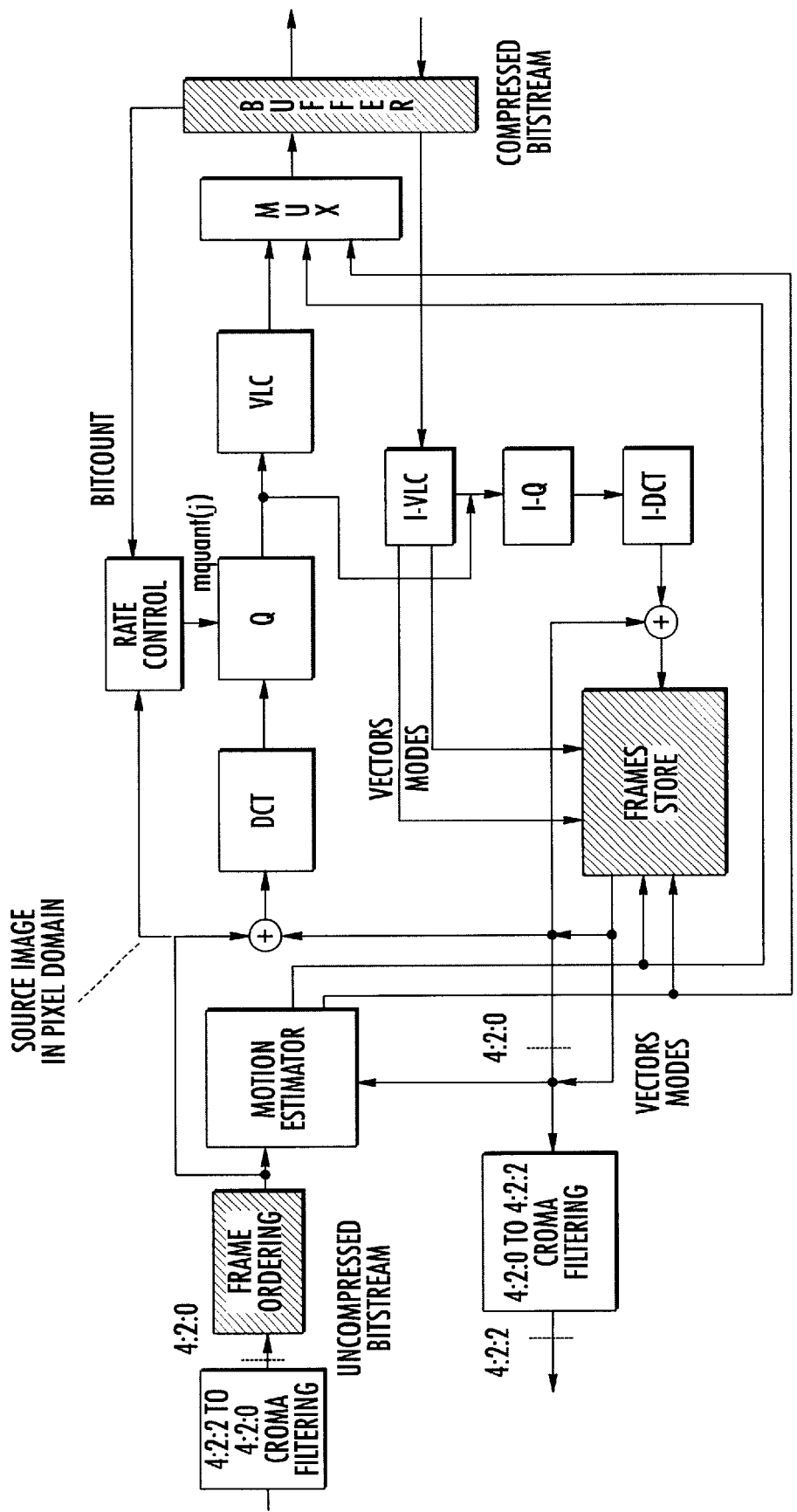
FIG. 1 is a block diagram of a MPEG2 video coder according to the prior art.
Figure 2:
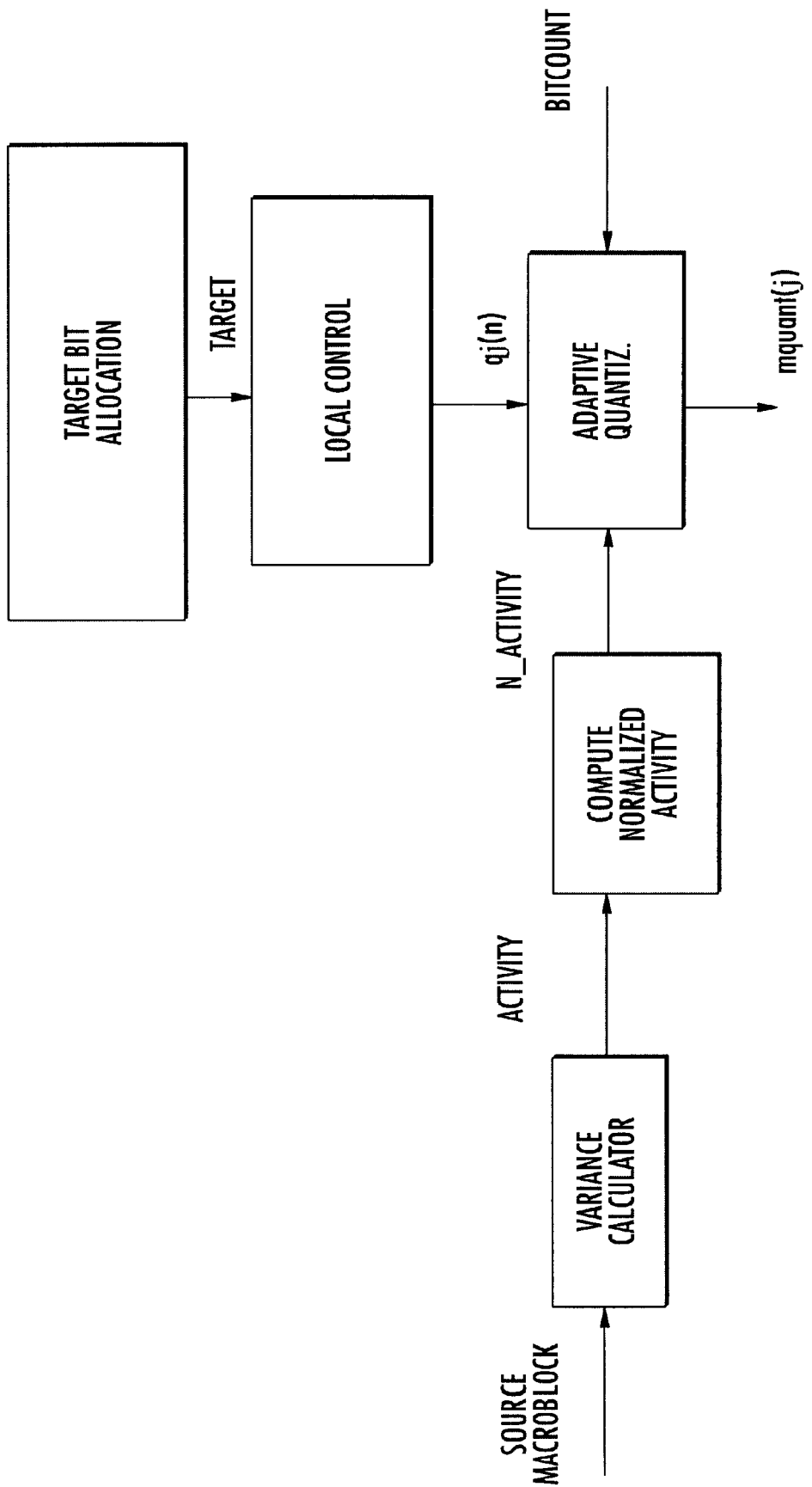
FIG. 2 is a block diagram of the rate control block illustrated in FIG. 1.
Figure 3:
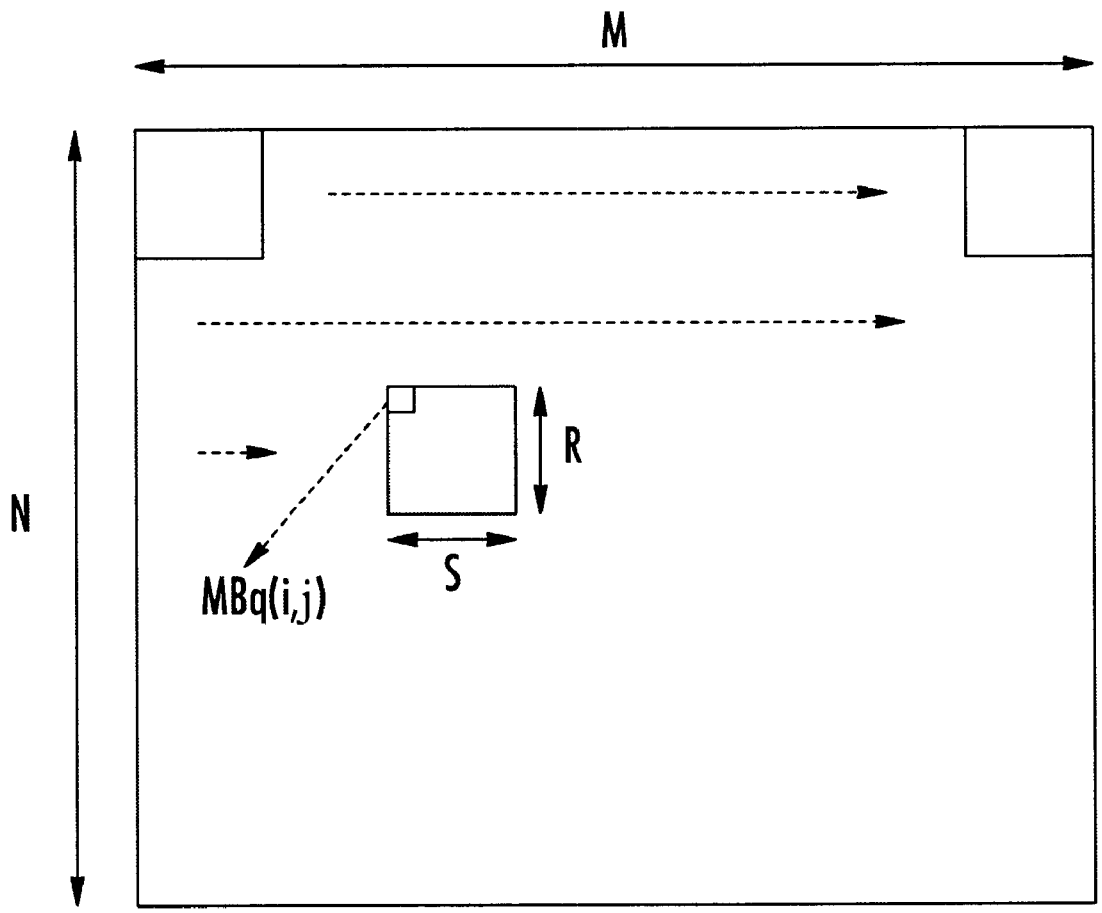
FIG. 3 shows the position of a certain macroblock on a video picture along with the scanning directions according to the prior art.
Figure 4:
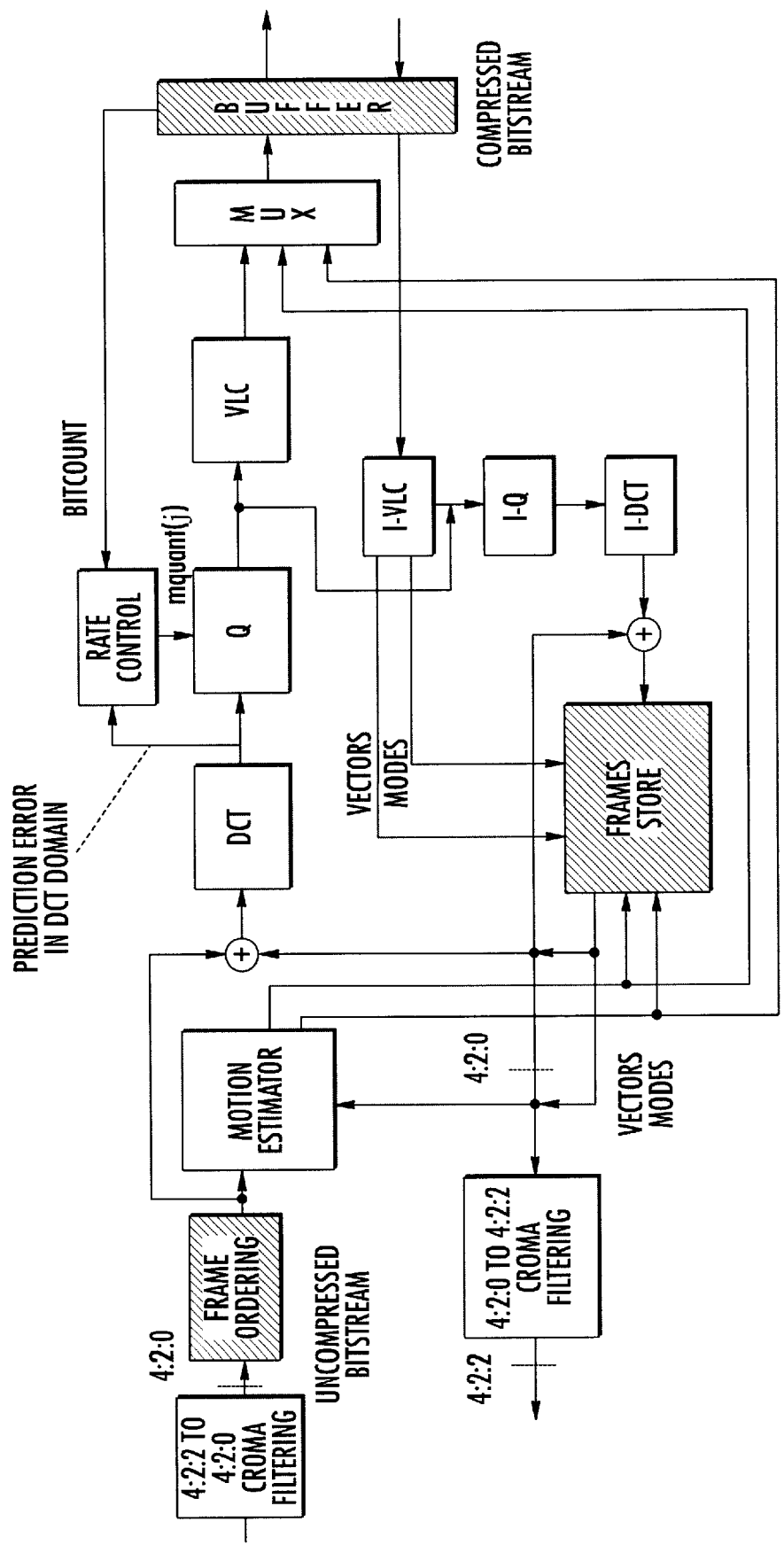
FIG. 4 is a block diagram of a MPEG2 video coder modified for implementing the method according to the present invention.
Figure 5:
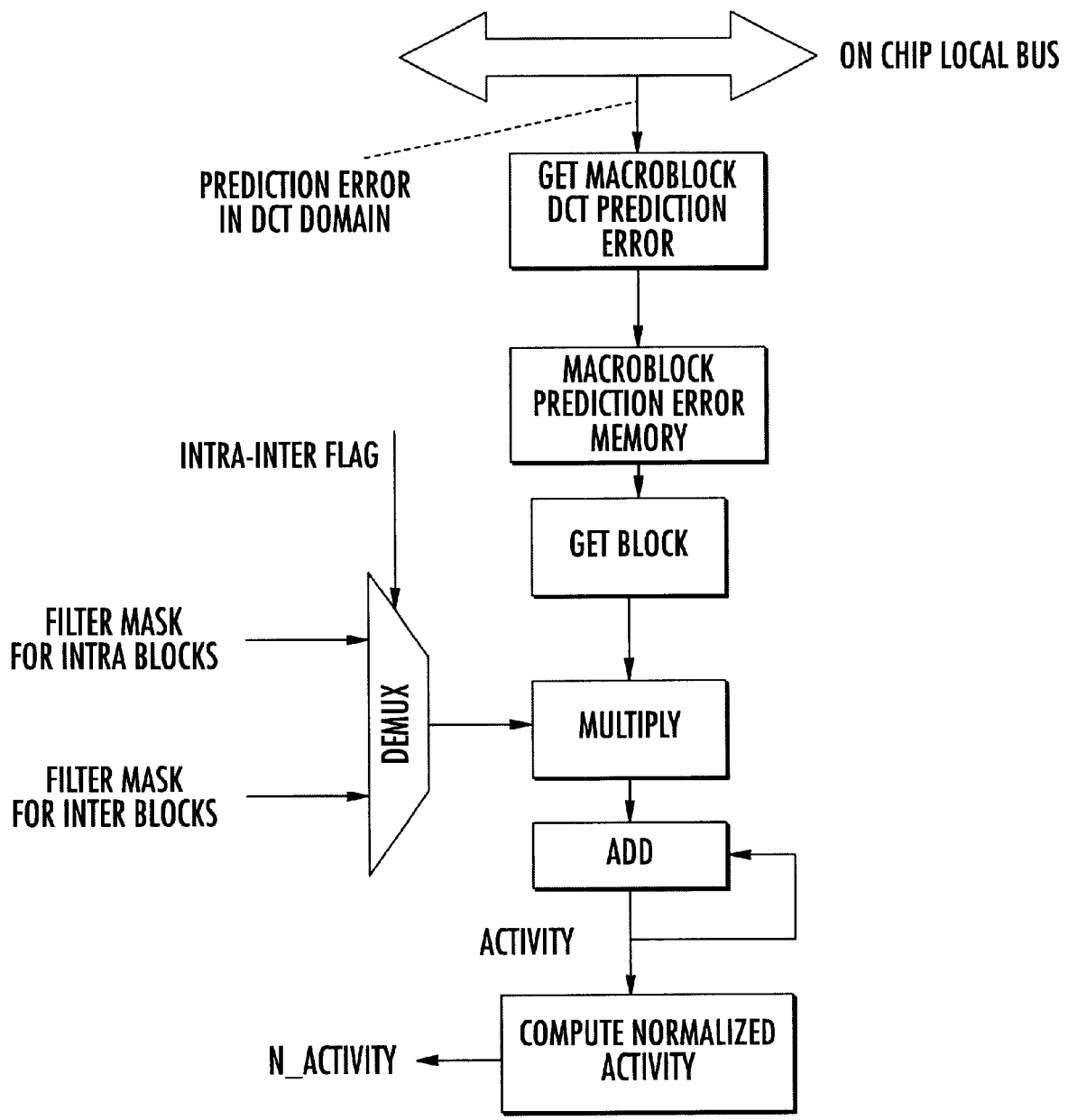
FIG. 5 is a flow chart for implementing the algorithm according to the present invention.

Referring to the MPEG2 standard, the method according to the present invention includes the following steps to be performed on the luminance component of a video signal. The method includes taking a certain macroblock in the discrete cosine transform domain, essentially before the respective quantization (GET MACROBLOCK DCT PREDICTION ERROR block), and storing it in a 16*16 word memory with 16 bits per each word.

The four blocks forming the DCT luminance component, including their respective 64 coefficients, are read from the memory. The absolute values of the coefficients are multiplied by a set of values (mask) composed of a number of values (words) smaller than the number of words forming the block. The mask is selected between two different masks. The first mask is dedicated to macroblocks of the intra type (I), and the second mask is for the macroblocks of the non-intra type (P or B).

The method further includes summing the products to produce an activity coefficient, and repeating the above procedure for the remaining blocks of the macroblock being processed. The coefficient actj is calculated as the sum of the four activity coefficients produced. The normalized activity is $$N\_actj = \frac{2*actj + \text{mean\_actj}}{actj + 2*\text{mean\_actj}}$$

A significant improvement in terms of computational complexity is achieved by the method according to the present invention. A typical but non limiting example of an application of the method to an MPEG coder is analyzed below.

Let us consider a typical method based on the calculation of the variance. As described before, the variance formula is:

$$\sum_{1\ldots 64} P_i \cdot P_i - \left[\sum_{1\ldots 64} P_l\right]^2$$

This implies 65 multiplications and 126 sums per respective block.

The method is based on the calculation of the activity in the spatial frequency domain of the DCT and is applied to a number of coefficients per mask that is significantly lower than 64, e.g., 15 for I blocks and 20 for P/B blocks.

The formula for the coefficient for blocks of the I type is:

$$\text{coeff\_frequency\_domain} = \sum_{1\ldots 15} \text{frequency\_mask}_i \cdot P_i$$

The formula for the coefficient for blocks of the P or B type is:

$$\text{coeff\_frequency\_domain} = \sum_{1 \ldots 20} \text{frequency\_mask}_i \cdot P_i$$

This respectively implies 15 (20) multiplications and 14 (19) sums. The object of significantly reducing the computational complexity is therefore reached.

That which is claimed is:

1. A method for measuring activity of a macroblock in a direct cosine transform domain for a selected component of a video picture, the method comprising:

dividing the macroblock into blocks of data in the discrete cosine transform domain before quantization, and separately storing each block of data in a memory;

reading each block of data stored in the memory for obtaining respective coefficients;

multiplying an absolute value of each coefficient by a selected mask of words comprising a number of words not exceeding a number of words forming each block;

summing results of the multiplications for producing an activity coefficient for each block;

calculating a first activity coefficient of the macroblock corresponding to a sum of the activity coefficients produced for each block; and calculating a normalized activity value of the macroblock as the ratio between a sum of double the first activity coefficient with a mean activity coefficient relative to a preceding coded frame, and a sum of double the mean activity coefficient with the first activity coefficient.

2. A method according to claim 1, wherein the selected mask is chosen among a group of different masks for each macroblock.

3. A method according to claim 2, wherein the group of different masks comprises a first mask for a macroblock comprising an Intra coded video picture, and a second mask for a macroblock comprising a non-Intra coded video picture.

4. A method according to claim 1, wherein the video picture is processed in accordance with an MPEG2 standard.

5. A method according to claim 1, wherein the selected component of the video picture comprises a luminance component.

6. A method according to claim 1, wherein the macroblock is divided into four blocks of data.

7. A method according to claim 1, wherein the selected component of the video picture is defined by a matrix having N rows and M columns, and the macroblock is defined by a matrix having R rows and S columns, where N/R and M/S are integers.

8. A method according to claim 7, wherein R is equal to 16 and S is equal to 16.

9. A method for measuring activity of a macroblock for a selected component of a video picture, the method comprising:

dividing the macroblock into blocks of data in a discrete cosine transform domain before quantization;

obtaining respective coefficients for each block of data;

multiplying an absolute value of each coefficient by a selected mask of words comprising a number of words not exceeding a number of words forming each block;

summing results of the multiplications for producing an activity coefficient for each block;

calculating a first activity coefficient of the macroblock corresponding to a sum of the activity coefficients produced for each block; and calculating a normalized activity value of the macroblock based upon the first activity coefficient and a mean activity coefficient relative to a preceding coded frame.

10. A method according to claim 9, wherein calculating the normalized activity value of the macroblock is based upon a ratio between a sum of double the first activity coefficient with the mean activity coefficient, and a sum of double the mean activity coefficient with the first activity coefficient.

11. A method according to claim 9, further comprising:

separately storing each block of data in a memory after dividing the macroblock; and reading each block of data stored in the memory for obtaining the respective coefficients.

12. A method according to claim 9, wherein the selected mask is chosen among a group of different masks for each macroblock.

13. A method according to claim 12, wherein the group of different masks comprises a first mask for a macroblock comprising an Intra coded video picture, and a second mask for a macroblock comprising a non-Intra video coded picture.

14. A method according to claim 9, wherein the video picture is processed in accordance with an MPEG2 standard.

15. A method according to claim 9, wherein the selected component of the video picture comprises a luminance component.

16. A method according to claim 9, wherein the macroblock is divided into four blocks of data.

17. A method according to claim 9, wherein the selected component is defined by a matrix having N rows and M columns, and the macroblock is defined by a matrix having R rows and S columns, where N/R and M/S are integers.

18. A method according to claim 17, wherein R is equal to 16 and S is equal to 16.

19. A video coder comprising:

a discrete cosine transform circuit for performing a discrete cosine transform on a video picture; and a rate control circuit connected to an output of said discrete cosine transform circuit for measuring activity of a macroblock for a selected component of the video picture, said rate control circuit comprising a first module for dividing the macroblock into blocks of data in the discrete cosine transform domain before quantization, a second module for obtaining respective coefficients for each block of data, a third module for multiplying an absolute value of each coefficient by a selected mask of words comprising a number of words not exceeding a number of words forming each block, a fourth module for summing results of the multiplications for producing an activity coefficient for each block, a fifth module for calculating a first activity coefficient of the macroblock corresponding to a sum of the activity coefficients produced for each block, and a sixth module for calculating a normalized activity value of the macroblock based upon the first activity coefficient and a mean activity coefficient relative to a preceding coded frame.

20. A video decoder according to claim 19, wherein said sixth module calculates the normalized activity value of the macroblock based upon a ratio between a sum of double the first activity coefficient with the mean activity coefficient, and a sum of double the mean activity coefficient with the first activity coefficient.

21. A video decoder according to claim 19, further comprising a memory, and wherein each block of data is separately stored in said memory.

22. A video decoder according to claim 19, wherein the selected mask is chosen among a group of different masks for each macroblock.

23. A video decoder according to claim 22, wherein the group of different masks comprises a first mask for a macroblock comprising an Intra coded video picture, and a second mask for a macroblock comprising a non-Intra coded avideo picture.

24. A video decoder according to claim 19, wherein the video picture is processed in accordance with an MPEG2 standard.

25. A video decoder according to claim 19, wherein the selected component of the video picture comprises a luminance component.

26. A video decoder according to claim 19, wherein the macroblock is divided into four blocks of data.

27. A video decoder according to claim 19, wherein the selected component is defined by a matrix having N rows and M columns, and the macroblock is defined by a matrix having R rows and S columns, where N/R and M/S are integers.

28. A video decoder according to claim 27, wherein R is equal to 16 and S is equal to 16.

* * * * *

UNITED STATES PATENT AND TRADEMARK OFFICE
CERTIFICATE OF CORRECTION

PATENT NO. : 6,542,643 B1
DATED : April 1, 2003
INVENTOR(S) : Pau et al.

It is certified that error appears in the above-identified patent and that said Letters Patent is hereby corrected as shown below:

Column 4,
Line 65, delete "aproposed" insert -- proposed --

Column 5,
Line 8, delete "the" insert -- the disjoined half-frames. --
Line 26, delete "infuence" insert -- influence --

Column 6,
Line 36, delete "is" insert -- is calculated as: --

Column 9,
Line 11, delete "avideo" insert -- video --

Signed and Sealed this

Sixteenth Day of September, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,542,643 B1
DATED         : April 1, 2003
INVENTOR(S)   : Pau et al.

It is certified that error appears in the above-identified patent and that said Letters Patent is hereby corrected as shown below:

<u>Title page,</u>
Item [73], delete "Microelectronics S.r.l." insert -- STMicroelectronics S.r.l. --

Signed and Sealed this

Sixteenth Day of March, 2004

JON W. DUDAS
*Acting Director of the United States Patent and Trademark Office*